United States Patent Office 2,710,789
Patented June 14, 1955

2,710,789

METHOD OF PREPARING SUBSTANTIALLY PURE POTASSIUM NITRATE

Guido Boeri, Milan, Italy, assignor to Brevetti Di Procedimenti Chimici S. r. l., Milan, Italy, a firm No Drawing. Application December 2, 1952,
Serial No. 323,708

Claims priority, application Italy April 1, 1952

3 Claims. (Cl. 23—102)

The present invention relates to a process for the utilization of raw tartaric materials, which is adapted to obtain therefrom calcium tartrate for the subsequent transformation into tartaric acid and adapted to recuperate all the potassium of the potassium bitartrate in the form of a "refined double potassium nitrate" commercially pure from chlorides, that is to say in the form of a salt of high commercial value.

It is known that according to a method generally used, tartaric raw materials containing normally high percentages of potassium bitartrate and low percentages of calcium tartrate, are treated, after previous drying, with calcium carbonate or calcium hydroxide, and with calcium chloride (or with the equivalent quantities of hydrochloric acid and of calcium carbonate or hydroxide), in order to transform the potassium bitartrate into calcium tartrate and into potassium chloride according to the following reaction scheme, wherewith the calcium tartrate previously present in the raw materials remains unaltered:

(1) $2C_4H_5O_6K + Ca(OH)_2 + CaCl_2 =$
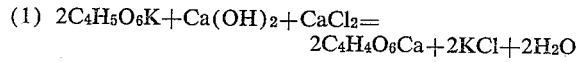
$2C_4H_4O_6Ca + 2KCl + 2H_2O$

The calcium tartrate separated by filtering and then washed to eliminate the potassium chloride, the calcium chloride and the other impurities, is transformed into tartaric acid. The filtered solution containing potassium chloride, calcium chloride and other impurities is then lost together with the wash water.

The disadvantages of this process are principally the following:

1. The considerable excess of calcium chloride that has to be employed in order to avoid heavy losses of tartaric acidity in the form of soluble salts of tartaric acid, has an unfavourable bearing on the cost price, and is lost with the waste liquor.

2. All of the potassium contained in the tartaric raw materials is also lost with the waste liquor in the form of potassium chloride, for the concentrating of said liquor would not be economically advantages owing to their excessive dilution, and also because the yield of $K_2O$ in the form of KCl is extremely modest.

The process of the present invention obviates the abovementioned inconveniences in integral manner and without any complications for tartaric acid, because:

(a) Instead of excess calcium chloride, calcium nitrate is employed in a quantity by little higher than the theoretical one;

(b) All of the $K_2O$ of the tartaric raw materials and all of the nitric acid of the calcium nitrate used as a precipitating reactant, is recovered in the form of potassium nitrate (that is to say in the form of a valuable potassium salt) commercially pure, for the tartaric raw materials are free from sodium salts and there is no intervention of hydrochloric acid in the process, as would make the absence of chlorides from the refined potassium nitrate as required in the world market, very hard to be obtained.

The process is carried out as follows:

The tartaric raw materials are dried if needed and are finely comminuted and then suspended in warm condition in a watery solution and are treated according to the following reaction equations, firstly with ground natural calcium carbonate (or calcium hydroxide) and subsequently with calcium nitrate in slight excess, in order to precipitate all of the tartaric acidity in the form of calcium tartrate, while the potassium present remains in solution as potassium nitrate:

(2) $2C_4H_5O_6K + CaCO_3 =$
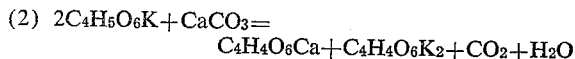
$C_4H_4O_6Ca + C_4H_4O_6K_2 + CO_2 + H_2O$ (3) $C_4H_4O_6K_2 + Ca(NO_3)_2 = C_4H_4O_6Ca + 2KNO_3$
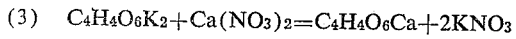

The calcium tartrate is separated by filtration from the potassium nitrate solution, and is then rationally washed with water, recycling the wash liquor in order to recover all of the potassium and to prepare concentrated potassium nitrate solutions. The calcium tartrate, washed to complete elimination of nitrates, is then transformed into tartaric acid according to the conventional process.

The aforesaid operations are carried out in the existing plants, requiring but slight adaptation, while the operations for refining the potassium nitrate require the erection of a very simple plant only.

If needed, that is to say if the potassium nitrate solution is very impure with impurities due to a too bulky use of wine lees in the mixture of tartaric raw materials, it will be subjected to the operation called "clarifying"; that is to say it will be alkalized at boiling temperature with hydroxide of lime, in order to separate in solid form a good deal of the impurities and to coagulate a good deal of the organic substances, and then it will be filtered.

The recovery of raw potassium nitrate from said solution and the subsequent refining thereof into pure potassium nitrate, are effected in a cheap manner and with little consumption of steam because operations are carried out with highly concentrated and almost pure solutions, since there are no chlorides and no sodium salts present, and this favours the obtaining of a refined double salt commercially free from chlorides, as demanded in the market. On the contrary, it is known that the preparation of potassium nitrate is generally performed with the classical method of the conversion of potassium chloride with sodium nitrate according to the equation:

(4) $KCl + NaNO_3 = KNO_3 + NaCl$

This method is based on the characteristic solubilities of the two salts, of which sodium chloride has an almost constant solubility at the different temperatures, while potassium nitrate has a modest solubility at low temperatures and a very high solubility at 100° C. Operating with this method, always in the presence of a saturated solution of sodium chloride, it will be understood how difficult it would be to obtain a potassium nitrate crystal free from chlorides and from sodium salts.

It is also known that in order to obviate this inconvenience, several methods of preparation of potassium nitrate were patented in the past years, which however have not completely attained the purpose aimed at.

Example relating to the treatment of a mixture of tartaric raw materials having a tartaric acidity of about 50%, constituted by about nine tenths of acidity of potassium bitartrate and by one tenth of calcium tartrate acidity.

In a wooden vat equipped with an agitator, 330 kg. finely ground tartaric raw materials having a tartaric acidity of 50%, constituted by 188 kg. potassium bitartrate and by 26 kg. calcium tartrate corresponding together to 165 kg. of tartaric acidity, are suspended in the wash waters of the tartrates of a preceding operation.

The mass is heated to 80–90° C. and 52 kg. ground natural calcium carbonate (or an equivalent quantity of calcium hydrate) are added gradually. After the effervescence is terminated 86 kg. of calcium nitrate calculated at 100% of $Ca(NO_3)_2$ (which may be prepared with the equivalent quantities of nitric acid and of calcium carbonate or hydrate) are added, keeping the temperature at 80–90° C. for about an hour more.

When the reaction is terminated, the slurry will contain 286 kg. of precipitated calcium tartrate, 101 kg. of potassium nitrate, 4 kg. of 100% calcium nitrate used in excess, besides the quantities of nitrates that were contained in the wash liquor of the tartrates of the preceding operation and that will remain soaking the calcium tartrate of this operation after filtration.

The calcium tartrate is washed with water to eliminate any trace of nitrate, whereafter it is passed to the plant for extracting tartaric acid according to conventional methods. The first wash waters of the tartrates, that is to say the more concentrated ones, will be used, to the necessary extent, in a subsequent operation.

The nitrate solution is passed to the plant for nitrate recuperation, wherein after previous clarifying if needed, subsequent crystallizing and concentrating operations are carried out to separate the crude potassium nitrate to be refined, and to concentrate the calcium nitrate, used in excess, in a restricted volume of mother liquor to be recycled (until they do not get too much polluted with impurities) with a subsequent operation in order to recuperate the calcium nitrate and to reduce the consumption of this reactant to a quantity very close to that necessary stoichiometrically.

From the refining of the crude nitrate, the refined double potassium nitrate will be obtained commercially free from chlorides.

The overall result is that taking into account the practical yields, to work up 100 kg. of tartaric acidity of tartaric materials having an average contents of 50% tartaric acidity, the consumption is about 51–52 kg. of 100% calcium nitrate, 32 kg. ground calcium carbonate, and there will be recovered about 58 kg. of refined double potassium nitrate commercially free from chlorides.

What I claim is:

1. A method of directly preparing substantially pure potassium nitrate which is free from sodium salts and chlorides, which comprises suspending raw material containing potassium acid tartrate in an aqueous medium, then adding a member of the group consisting of calcium carbonate, calcium hydroxide and calcium oxide to form and precipitate calcium tartrate while forming potassium tartrate in solution and then adding calcium nitrate to precipitate more calcium tartrate and to form a solution of potassium nitrate, and recovering potassium nitrate from said solution.

2. A method of preparing substantially pure potassium nitrate, according to claim 1, wherein the aqueous medium employed contains potassium nitrate recovered from a preceding operation, whereby the ultimate potassium nitrate solution obtained has a high nitrate content.

3. A method of preparing substantially pure potassium nitrate as defined in claim 1, which further comprises recovering potassium nitrate by crystallization of the potassium nitrate solution, and recovering the mother liquor from said crystallization, which mother liquor contains unused excess calcium nitrate, and recycling said mother liquor for treatment of further raw material with said contained calcium nitrate.

References Cited in the file of this patent

UNITED STATES PATENTS 2,303,602    Braun  ---------------- Dec. 1, 1942